(12) United States Patent
Steinmair et al.

(10) Patent No.: US 10,676,046 B2
(45) Date of Patent: Jun. 9, 2020

(54) WIRING HARNESS AND METHOD FOR THE PRODUCTION THEREOF

(71) Applicant: Bayerische Motoren Werke Aktiengesellschaft, Munich (DE)

(72) Inventors: Gernot Steinmair, Steyr (AT); Hasan Cehic, Munich (DE); Peter Hill, Olching (DE); Stephan Bollner, Wolfratshausen (DE); Michael Stips, Neuried (DE); Klaus Eckl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 118 days.

(21) Appl. No.: 14/713,704

(22) Filed: May 15, 2015

(65) Prior Publication Data

US 2015/0246648 A1 Sep. 3, 2015

Related U.S. Application Data

(63) Continuation of application No. PCT/EP2013/073805, filed on Nov. 14, 2013.

(30) Foreign Application Priority Data

Nov. 16, 2012 (DE) .................. 10 2012 220 940

(51) Int. Cl.
*B60R 16/02* (2006.01)
*B60R 16/03* (2006.01)
(Continued)

(52) U.S. Cl.
CPC ...... *B60R 16/0215* (2013.01); *B60R 16/0207* (2013.01); *B60R 16/03* (2013.01);
(Continued)

(58) Field of Classification Search
CPC . B60R 16/0215; B60R 16/03; B60R 16/0207; H01B 7/0045; H01B 13/012;
(Continued)

(56) References Cited

U.S. PATENT DOCUMENTS

| 5,791,936 A * | 8/1998 | Nicholson .......... H01R 13/5213 439/521 |
| 7,766,673 B1 * | 8/2010 | Dumont ................ H01R 13/68 439/76.2 |

(Continued)

FOREIGN PATENT DOCUMENTS

| DE | 295 12 907 U1 | 11/1995 |
| DE | 103 08 759 A1 | 9/2004 |

(Continued)

OTHER PUBLICATIONS

International Search Report (PCT/ISA/210) dated Feb. 25, 2014, with English translation (Six (6) pages).
(Continued)

*Primary Examiner* — Jared Fureman
*Assistant Examiner* — Joel Barnett
(74) *Attorney, Agent, or Firm* — Crowell & Moring LLP

(57) ABSTRACT

A vehicle has a wiring harness and a substantially electrically non-conductive body. The vehicle has at least one ground point. At least one bus bar is associated with the wiring harness. The at least one bus bar is associated with the at least one ground point. The ground point is electrically connected to the bus bar, and the bus bar is mechanically fixed in the vehicle.

12 Claims, 8 Drawing Sheets

(51) Int. Cl.
*H01B 7/00* (2006.01)
*H01B 13/012* (2006.01)
*H01R 4/64* (2006.01)
*H01R 43/28* (2006.01)
*B62D 29/00* (2006.01)

(52) U.S. Cl.
CPC ......... *H01B 7/0045* (2013.01); *H01B 13/012* (2013.01); *B62D 29/00* (2013.01); *H01R 4/64* (2013.01); *H01R 43/28* (2013.01); *H01R 2201/26* (2013.01); *Y10T 29/49169* (2015.01)

(58) Field of Classification Search
CPC .. Y10T 29/49169; B62D 29/00; H01R 43/28; H01R 2201/26; H01R 4/64
See application file for complete search history.

(56) References Cited

U.S. PATENT DOCUMENTS

| | | | |
|---|---|---|---|
| 7,785,158 | B1 | 8/2010 | McCoy et al. |
| 2004/0232725 | A1 | 11/2004 | Marelja |
| 2005/0260874 | A1* | 11/2005 | Murakami ........... H01R 4/2433 439/142 |
| 2011/0094796 | A1 | 4/2011 | Toyama et al. |
| 2012/0264327 | A1* | 10/2012 | Carnevale ................ H01R 4/36 439/449 |
| 2013/0093239 | A1* | 4/2013 | Brunner ................. B62D 21/17 307/10.1 |

FOREIGN PATENT DOCUMENTS

| | | |
|---|---|---|
| DE | 10 2010 042 963 A1 | 5/2011 |
| DE | 10 2010 007 108 A1 | 8/2011 |
| EP | 0 895 306 A1 | 2/1999 |
| GB | 2 381 670 A | 5/2003 |
| JP | 2009-107542 A | 5/2009 |

OTHER PUBLICATIONS

German Search Report dated Jun. 14, 2013, with English translation (Eleven (11) pages).
"BTF/PTM": "Anyone here make their own grounding for the firewall?", Classic Zcar Club, 2011, XP002720007, Retrieved from the Internet: URL: http://www.classuczcars.com/forums/electrical-s30/37932-anyone-here-make-their-own-groudning-bar-firewall.html, (Five (5) pages).

* cited by examiner

WIRING HARNESS AND METHOD FOR THE PRODUCTION THEREOF

CROSS REFERENCE TO RELATED APPLICATIONS

This application is a continuation of PCT International Application No. PCT/EP2013/073805, filed Nov. 14, 2013, which claims priority under 35 U.S.C. § 119 from German Patent Application No. 10 2012 220 940.9, filed Nov. 16, 2012, the entire disclosures of which are herein expressly incorporated by reference.

BACKGROUND AND SUMMARY OF THE INVENTION

The invention relates to a vehicle with a wiring harness, which ties a group of ground conductors into a bundle, and a method for the production of the wiring harness.

The physical electrical system of a modern vehicle has a complex architecture. It consists of an electrical grid that is designed as a wiring harness. This means that various cables such as ground conductors or supply lines are combined into bundles that form the wiring harness, also known as a cable harness.

The electrics/electronics of a modern vehicle with a partially electrified drive train has an even higher degree of complexity. This also concerns the cable harness and is explained in German patent document DE 102010042963 A1, for example.

The object of the invention is to provide an improved vehicle with a cable tree that ties a group of ground conductors into a bundle, and with an essentially electrical non-conductive body as well as a method for the production of the wiring harness.

This and other objects are achieved according to the invention by providing a vehicle with a cable harness and with an essentially electrically non-conducting body, wherein the vehicle includes at least one ground point, at least one bus bar is assigned to the cable harness, and the at least one bus bar is assigned to the at least one ground point. The ground point is electrically connected with the bus bar, and the bus bar is mechanically fixed in the vehicle. A method of producing the cable harness is also provided.

The invention teaches that the vehicle includes at least one ground (mass) point and the cable harness includes at least one bus bar that is assigned to the at least one ground point, wherein the ground point is electrically connected with the bus bar and the bus bar is mechanically fastened in the vehicle.

In this manner, components of the cable tree are electrically connected with the ground point in the vehicle by means of the bus bar in order to bring about an electrical ground connection with the ground conductors that are connected with the components of the vehicle.

In vehicles with a non-conductive body, the same is not suitable for use as a return conductor for electrical consumers. Ground conductors have to be laid across longer paths and in bundles with a larger number of ground conductors to a few ground points or even only a single ground point than with a vehicle with a metallic body. Consequently, depending upon the vehicle equipment, a particularly high number of ground conductors is to be connected electrically to the ground on this ground point. A space saving and easy to fit bus bar is therefore particularly advantageous.

This particularly applies to a vehicle with a body, for example, which is essentially produced from carbon fiber reinforced plastic.

According to a preferred embodiment of the invention, the cable harness ties a group of ground conductors into a bundle, which are run through a bundle of the cable tree to the bus bar that is assigned to the group of ground conductors and is electrically connected with it.

This is advantageous because for producing the ground connection, it is not necessary that each individual ground conductor must be provided with a connector, which in turn is then connected with a ground strip or similar to serve as mating connector. The use of a bus bar facilitates savings in installation space, material, and installation costs.

Furthermore, a method for producing a cable harness for a vehicle according to the invention is proposed in particular for producing an electrical contact between the group of ground conductors of the cable harness and the at least one bus bar of the cable harness, which includes the following steps:

a) Providing the cable harness bundle with the group of ground conductors;
b) Providing a bundle template for the cable harness bundle and a first conductor template for the group of ground conductors;
c) Inserting the cable harness bundle into the bundled template and inserting each individual ground conductor of the group of ground conductors into a conductor guide element assigned to the related ground conductor of the first conductor template and fixing the group of ground conductors with a second conductor template.

The advantage of this method is that the ground conductors can be present in different lengths. The bundle template can provide guide elements for the bundle, onto which the bundle is to be attached. These could also be adjustable variably to match the template to the bundle diameter, and to be able to process various cable harness bundles with one bundle template. The conductor guide elements of the first conductor template are preferably designed as swages or as grooves, wherein one guide element exists for each of the ground conductors.

Further steps of the process are:

d) Trimming, i.e. cutting, the group of ground conductors with a trimming element;
e) Stripping each ground conductor of the group of ground conductors with a stripping unit, in order to expose a group of stranded wires from the group of ground conductors;
f) The ground conductors are cut to a defined length, and the stranded wires of the ground conductors are exposed; Then these steps follow:
g) Providing a first bus bar element;
h) Inserting each individual stranded wire of the group of stranded wires into one stranded wire guide element assigned to the related ground conductor of the first bus bar element;
i) Providing a second bus bar element and connecting the first bus bar element with the second bus bar element for producing the bus bar.

The bus bar facilitates contacting the group of stranded wires in conjunction with the bus bar. It describes the process for cost-effective and easy to fit steps for producing a wire harness with at least one bus bar for ground conductors. A wound or tubular cable harness bundle with the ground conductors serves as a starting base. On a template, the group of ground conductors that consists of insulated ground conductors of various lengths is trimmed, stripped, and connected with the bus bar.

According to a further variant of the method, the cable harness bundle to be provided includes a branch point, wherein the group of ground conductors is run out from the cable harness bundle at the branch point, and on which the bundled template to be provided includes an isolation port for the cable harness bundle and the group of ground conductors.

In this instance, the cable harness bundle at the branch point is run through the isolation port of the template, so that a part of the template isolates the group of ground conductors from the at least one other isolation piece of the cable harness bundle for further processing.

In this way, an optionally branched cable harness with possibly multiple bus bars can be produced.

The invention is based upon the considerations stated below.

In a typical vehicle cable harness, cable cores with the same contacting, such as ground conductors, are normally crimped together with one female disconnect and then plugged by means of the end fittings generated by the crimping into line collectors (with the selected example of ground conductors into so-called ground strips) group by group.

Such ground strips can be screwed or connected onto body-mounted ground bolts at any places of a vehicle having a metal body. The chassis ground connection of the vehicle, which is typically formed by the negative battery terminal, exists via the ground bolts and via the metallic conductive vehicle body. Because of the potential plurality of ground bolts in the vehicle, the ground conductors must usually be run only across a "short" distance in the vehicle.

This is not possible with a vehicle with a plastic body. Because of the inadequate electrical conductivity of the body, all and/or a plurality of ground conductors must be run to a central collection point and/or to central collection points. This is problematic if crimped ground conductors and ground strips are used because this means a plurality of female disconnects on an outlet piece of the cable harness as well as a plurality of ground strips with qualified screw connections on the body. This requires a high effort in terms of the weight, the required installation space, production engineering as well as the assembly and ease of maintenance. One of the problems to be solved for cable harnesses in plastic bodies is to reduce the material, assembly, integration cost and therefore the expense required for the connection of ground connectors.

A solution based upon a bus bar is provided. The bus bar is based upon a template system and can be integrated into the vehicle, which saves installation space and facilitates an efficient assembly of the ground connection of the ground conductors.

Other objects, advantages and novel features of the present invention will become apparent from the following detailed description of one or more preferred embodiments when considered in conjunction with the accompanying drawings.

DETAILED DESCRIPTION OF THE DRAWINGS

Identical reference symbols are used in the figures to describe identical technical features.

Figure 1:
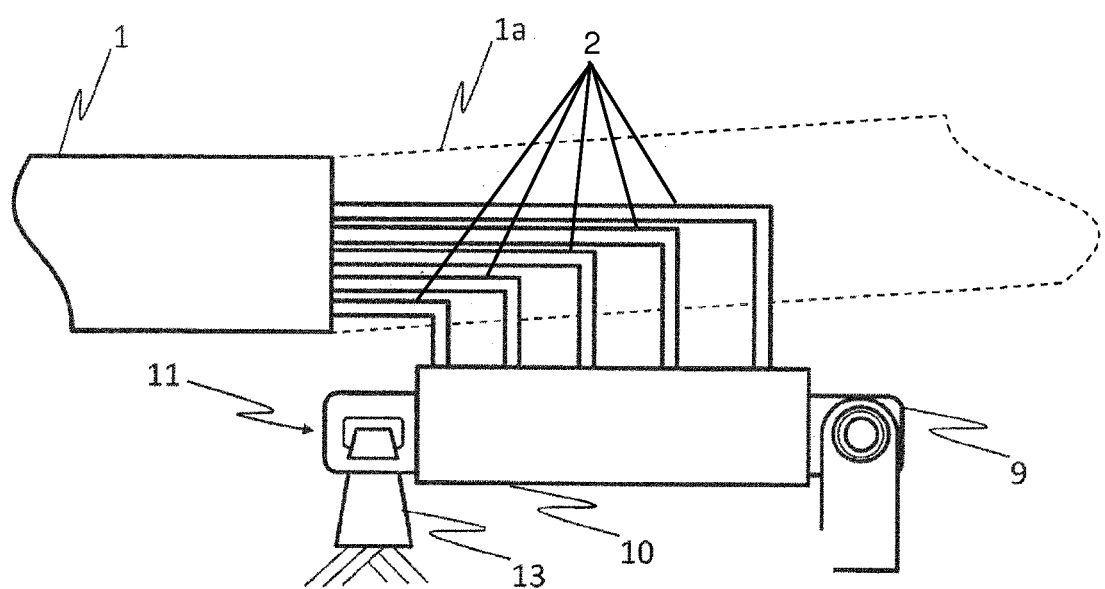
FIG. 1 is a schematic diagram of a cable harness integrated in a vehicle with a bus bar element integrated in the vehicle.

FIG. 1 illustrates a section of a cable harness with a branch. A group of ground conductors (2) as well as a branched bundle (1a) branch off from a cable harness bundle (1). The group of ground conductors is electrically connected with a bus bar (11). The bus bar is integrated in the vehicle and is fastened on the vehicle with a screw connection (9) without limitation of the overall layout. The bus bar is additionally connected with a ground point (13) of the vehicle, an example of which is designed to be hook-shaped in FIG. 1.

The ground point (13) is electrically connected with a chassis ground of the vehicle. The electrical connection of the ground point with the bus bar and of the bus bar with the group of ground conductors ensures that each individual ground conductor is connected with the chassis ground.

The ground conductors connect electrical consumers (loads) in the vehicle with the chassis ground. In a vehicle with a carbon fiber reinforced body, which is given according to this embodiment, a plurality of ground conductors that are assigned to the respective electrical consumers is run to the ground point. This is required because unlike in a vehicle with a sheet-metal body, the body components cannot serve as return conductors for the electrical consumers. Unlike with a vehicle with a sheet-metal body, an electrical consumer that is attached to a body component therefore requires not only a supply conductor for the electrical potential, but also a return conductor, i.e. a ground conductor, for the chassis ground.

The electrical consumers are integrated decentralized in the vehicle. The ground point is accommodated centralized in a vehicle with a non-conductive body, i.e. a plurality of ground conductors must be conjoined at this point. It is therefore necessary to connect a plurality of bundled ground conductors, which is referred to as the group of ground conductors, with the electrical potential of the ground point in an installation space that is as small as possible.

The bus bar accommodates the group of ground conductors and connects it with the same electrical potential. This is also advantageous in that not each individual ground conductor must be provided with a connector, e.g. with a spade connector, which in turn must be connected in a further step with a mating part of the spade connector that is to be connected with the ground point.

In other words, this means that centrally conjoined ground conductors with similar potential or conductivity characteristics are already connected during the cable harness production directly and without further intermediate elements with the bus bar, which during the subsequent vehicle assembly is to be connected on a ground point in the vehicle merely by a screw connection that must be produced. In this way, installation space in the area of the ground point can be saved in the vehicle and the assembly expense is minimized during the production of the ground connection. This saves assembly time during the vehicle production and reduces the fault susceptibility significantly compared to the expenditure that is created when producing a connection of two spade connector elements for each individual ground connector.

In addition to the advantageous installation space efficiency, the bus bar is also capable of achieving weight savings and reducing costs, particularly compared to a technical solution with connectors. The low complexity of the system moreover increases the reliability and durability of the ground connection.

Figure 2:
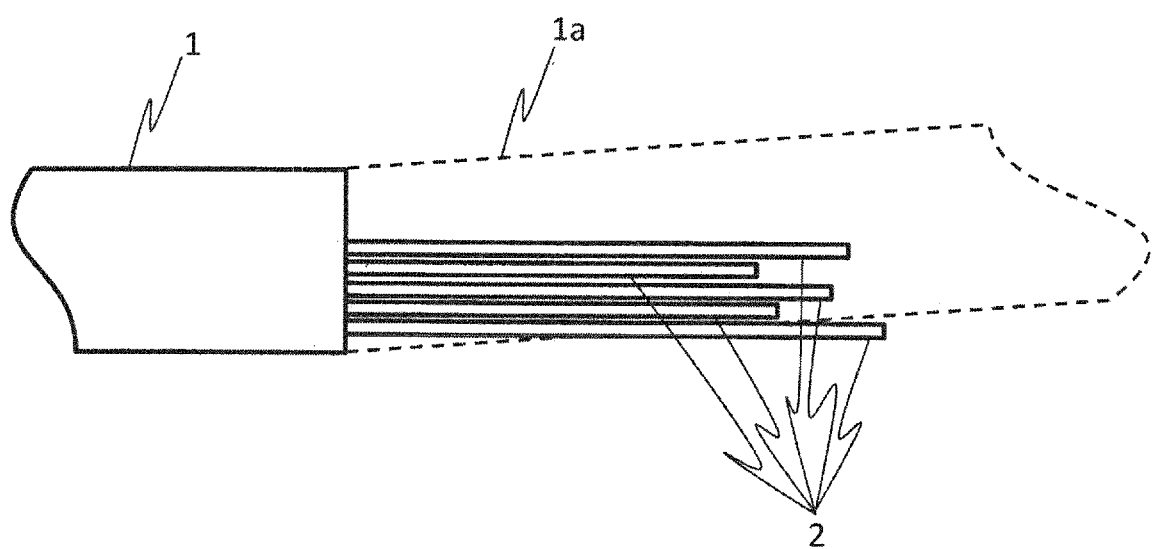
FIG. 2 is a schematic diagram showing the cable harness bundle with free-standing ground conductors.
Figure 3:
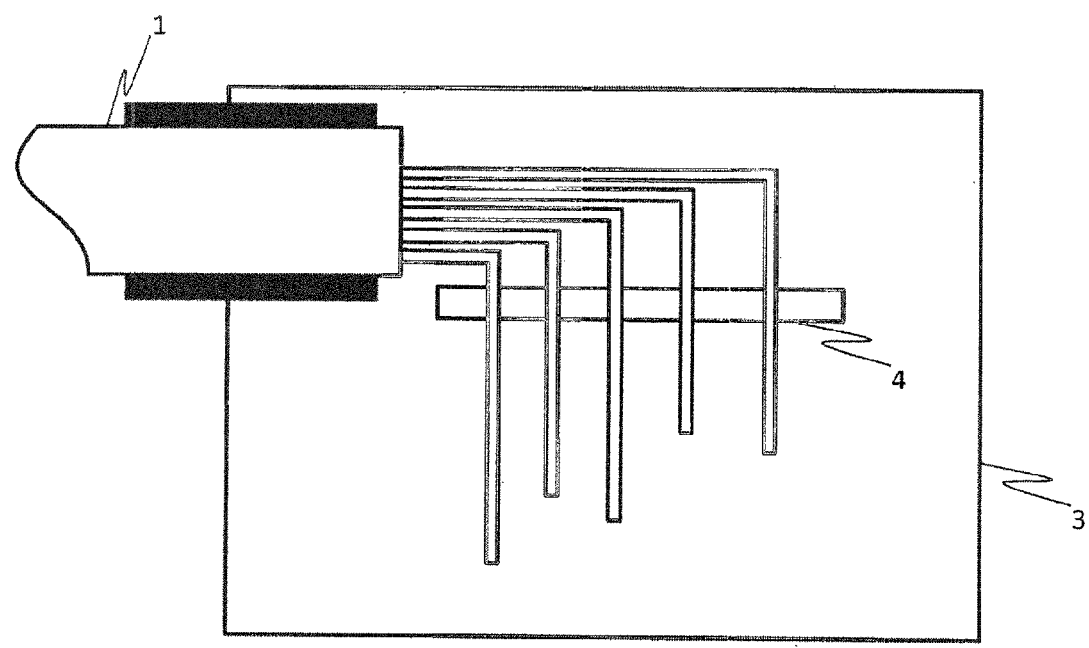
FIG. 3 is a schematic diagram showing the attaching of the cable harness bundle onto a template.
Figure 3A:
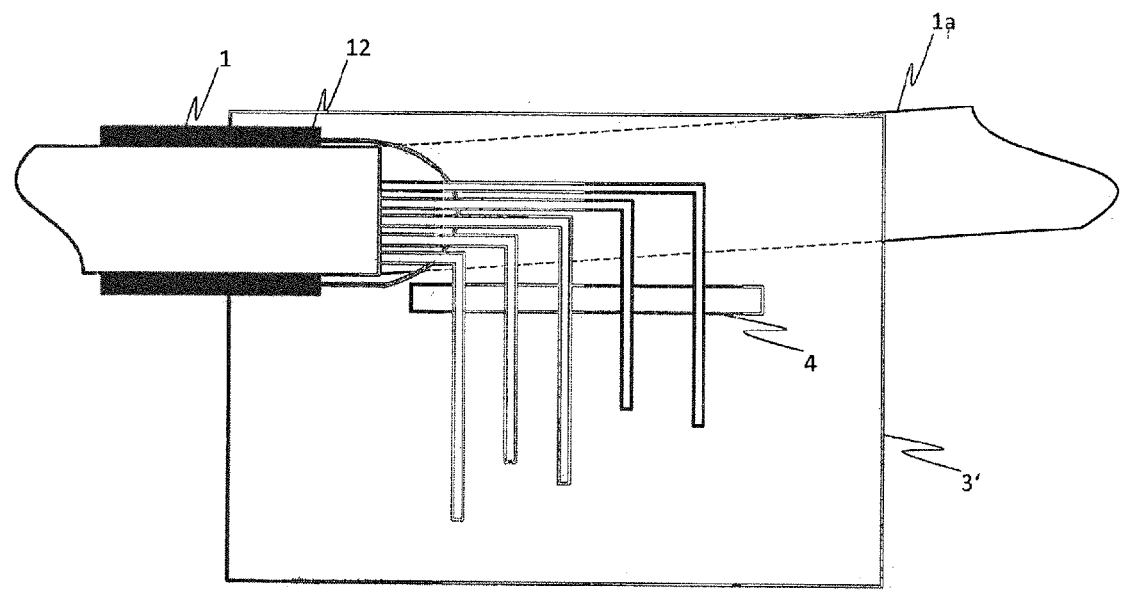
FIG. 3A is a schematic diagram showing the attaching of a branched cable harness bundle onto a template.

Process steps for producing a cable harness pursuant to FIG. 1 follow from the FIGS. 2 to 7 and from FIG. 3a.

According to FIG. 2, a bundle (1) of a cable harness is provided initially. The bundle includes ground conductors, which are assigned to the electrical consumers in the vehicle and emerge in different lengths from the bundle, which can be wrapped, bandaged, or tubed.

It is also possible that the group of ground conductors can emerge on a junction or on a nodal point of the cable harness. Then, the bundle (1) branches into the group of ground conductors (2) and into a further bundle (1a) that is indicated with dotted lines in FIG. 2. Both the case of a single bundle as well as the case of a branched bundle are still being considered.

In the case of a single bundle, the single bundle will be attached on a bundle template (3) according to FIG. 3. The bundle template also includes a template for the single conductors of the group of ground conductors. FIG. 3a illustrates a bundle template (3') for a branched bundle, wherein said bundle template includes an isolation port (12) in contrast to the bundle template (3). When attaching the branched bundle onto the bundle template, the further bundle (1a) is run through the isolation port such that the bundle template separates the group of ground conductors from the further bundle (illustrated by dotted line).

It is also possible to produce a single bundle pursuant to FIG. 2 on a template with an isolation port pursuant to FIG. 3a. The prerequisite is that the template (3) or (3') is assigned to the cable harness to be processed and is matched to it, for example with respect to the bundle diameter.

In FIGS. 3 and 3a, the ground conductors are fitted individually into a conductor guide element (4) that is assigned to the respective ground template. This preferably occurs by the insertion of the respective conductor into a groove provided for this purpose.

For the benefit of a simpler representation without limiting the overall layout, FIG. 4-7 start off from a single bundle according to FIG. 3.

Figure 4:
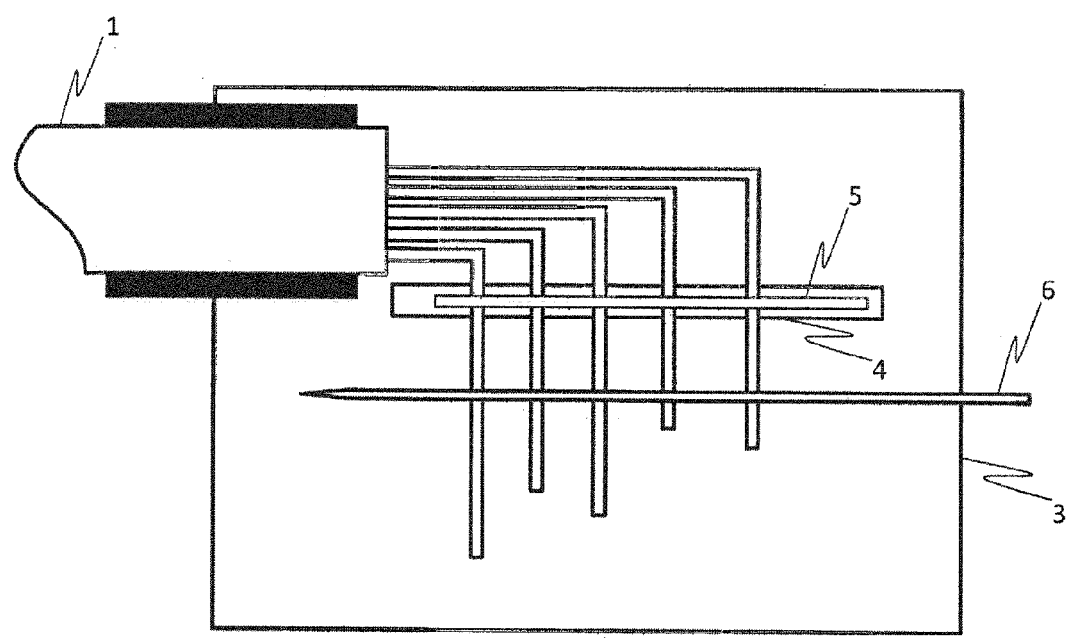
FIG. 4 is a schematic diagram showing the fixing and trimming of the ground conductors.

After the conductors are inserted, they are fixed with a fixing template (5) in the conductor guide element (4) according to FIG. 4. Same as the conductor template, the fixing template is also matched to the group of ground conductors. According to FIG. 4, the ground conductors of different lengths are cut to a defined length with a trimming tool (6) such as with an automatic cutting knife. This process step has the advantage that the length of these bundles during the bundling of the conductors of the cable harness, which occurred earlier during the production, must only be observed within the scope of an approximate length specification. A defined length will be adjusted by the trimming step.

Figure 5:
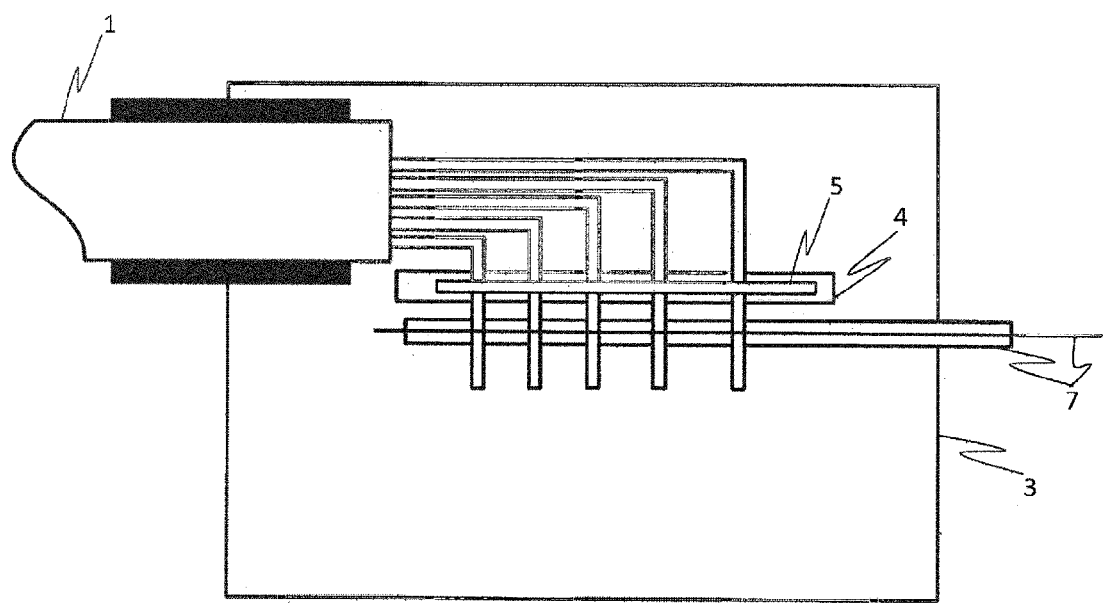
FIG. 5 is a schematic diagram showing the stripping of the cut ground conductors.

Pursuant to FIG. 5, the trimmed ground conductors are stripped with the aid of a wire stripper (7). In this step, the individual stranded wires of the group of ground conductors are exposed.

Figure 6:
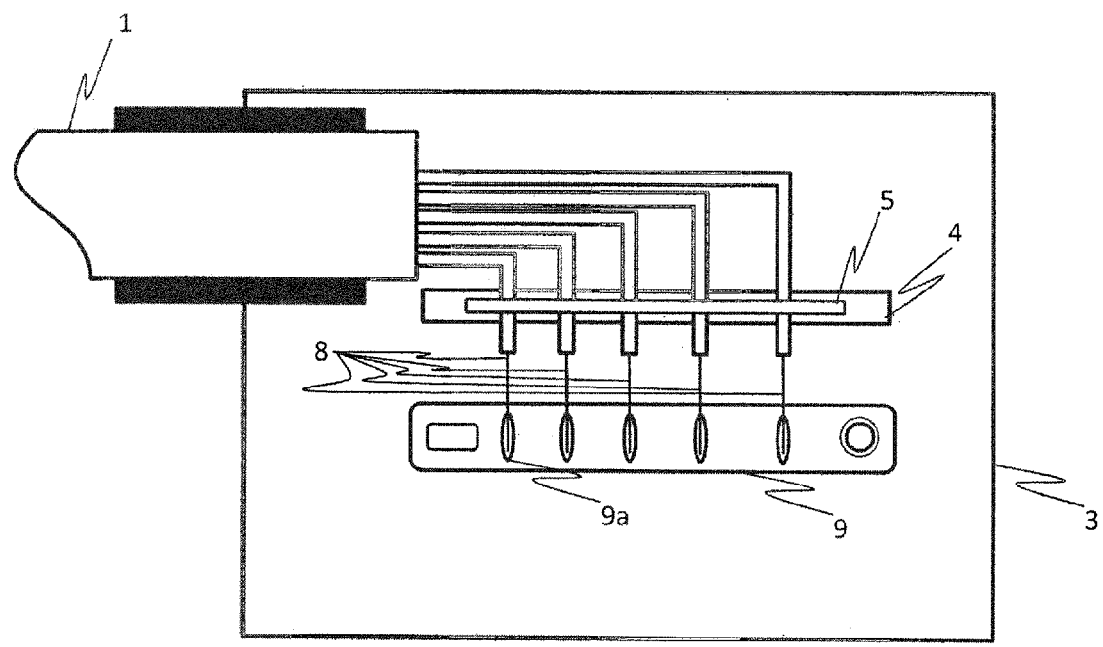
FIG. 6 is a schematic diagram showing the mounting of a first bus bar element.
Figure 7:
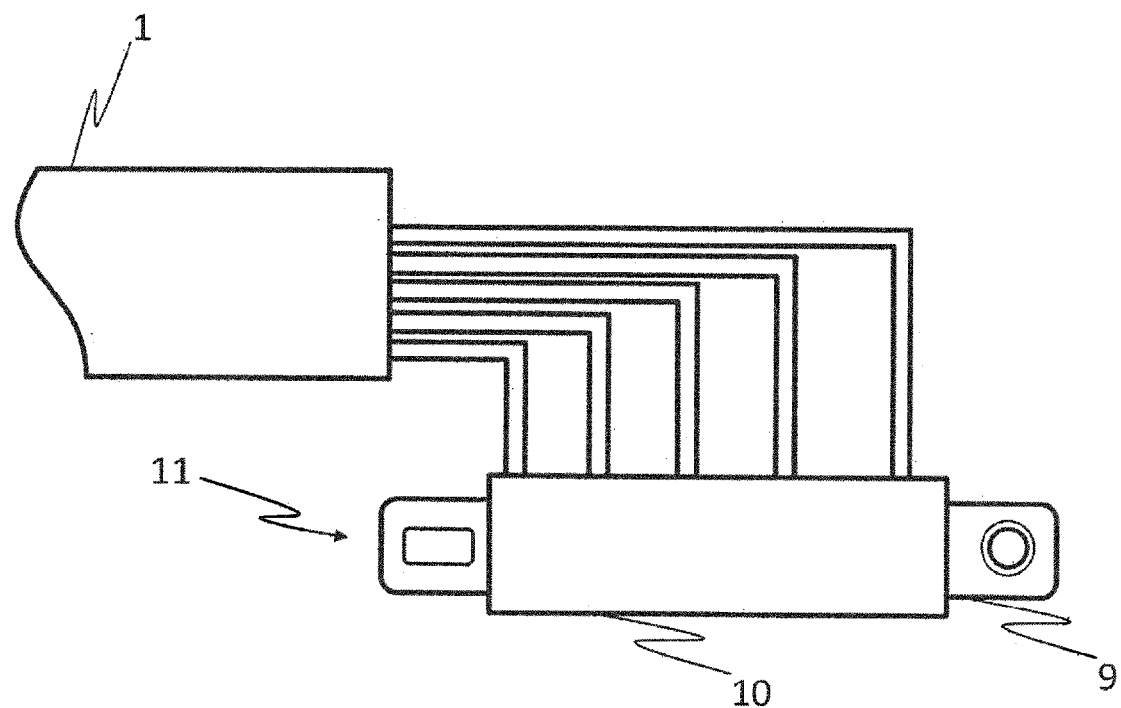
FIG. 7 is a schematic diagram showing the mounting of a second bus bar element.

According to FIG. 6, the exposed group of stranded wires (8) is fitted into a metallic support piece (9) of a bus bar. For this purpose, a guide element (9a) such as a swage is assigned to each stranded wire of the group of stranded wires. According to a last step, the support piece (9) of the bus bar is connected with a fixing piece (10), so that the stranded wires are durably conductive in contact with the metallic guide element. This connection can be done by soldering, pressing or crimping. Thereafter, the fixing template is detached to separate the cable harness bundle and the bus bar from the templates (3) and (4).

Optionally, in the area of the connection with the stranded wires, the bus bar can be enclosed sealingly with insulating material.

Pursuant to a further variant, the bus bar can have a larger number of swages than stranded wires to be connected. Thus, for retrofitting or repair purposes, for example, additional stranded wires can be electronically connected to the bus bar.

The advantage of this method is that the assembly expenditure is shifted from the vehicle production to the component production. Furthermore, quality assurance measures can already be considered during the component production. However, this will barely affect the component supply because the geometrical design of the bus bar can be accomplished as "tight-fitting" against the wire harness bundle, so that no disadvantages arise compared to a traditional cable harness in terms of transportability, suitability for packaging and handling in the logistics between a component supplier and a vehicle producer.

Furthermore, the production is efficient because the process steps affect a whole group of respective ground conductors, and a separation of the process steps to the respective ground conductors is minimized to the specific ground conductors.

The bus bar can also be designed and constructed to be geometrically variable in terms of the requirement for ease of integration. Anti-rotation elements for the connection can be provided in the vehicle, for example. Instead of a durable screw connection in the vehicle, a plug-in connection can also be effective. With a screw connection, the number of screwing operations during conveyor belt assembly can be kept very low if the bus bar is attached onto the ground point using only one single screw connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    an essentially electrically non-conducting vehicle body;
    at least one ground point arranged in the vehicle;
    a cable harness of the vehicle, the cable harness bundling only ground conductors;
    at least one bus bar associated with the cable harness, wherein
        the at least one bus bar is further associated with the at least one ground point,
        the ground point is hook-shaped and is electrically connected with the bus bar, and the bus bar is mechanically fixed in the vehicle having the essentially electrically non-conducting vehicle body.

2. The vehicle according to claim 1, wherein the at least one bus bar is associated with the ground conductors, a bundle of the cable harness leads the ground conductors to the bus bar, and the ground conductors is electrically connected with the bus bar.

3. The vehicle according to claim 2, wherein the vehicle body is an essentially carbon fiber reinforced plastic vehicle body.

4. The vehicle according to claim 1, wherein the vehicle body is an essentially carbon fiber reinforced plastic vehicle body.

5. The vehicle according to claim 1, wherein the bus bar is mechanically fixed in the vehicle having the essentially electrically non-conducting vehicle body, and the cable harness is integrally formed with the at least one bus bar, such that the cable harness is directly connected to the bus bar without any connectors.

6. The vehicle according to claim 5, wherein the bus bar is grounded at only a single location provided on a first distal end thereof, and the bus bar is fixed at a second distal end thereof that is opposite to the first distal end.

7. An electrical connection system for a vehicle having an essentially electrically non-conducting vehicle body, the electrical connection system comprising:

a ground point configured to be arranged in the vehicle;

a wire harness that bundles only ground conductors; and a bus bar associated with the cable harness, wherein the ground point is hook-shaped and is configured to be electrically connected with the bus bar, and the bus bar is mechanically fixed in the vehicle having the essentially electrically non-conducting vehicle body.

8. The electrical connection system according to claim 7, wherein the bus bar is associated with the ground conductors, a bundle of the wire harness leads the ground conductors to the bus bar, and the ground conductors is electrically connected with the bus bar.

9. The electrical connection system according to claim 8, wherein the vehicle body is an essentially carbon fiber reinforced plastic vehicle body.

10. The electrical connection system according to claim 7, wherein the vehicle body is an essentially carbon fiber reinforced plastic vehicle body.

11. The electrical connection system according to claim 7, wherein the bus bar is configured to be mechanically fixed in the vehicle having the essentially electrically non-conducting vehicle body, and the wire harness is integrally formed with the bus bar, such that the wire harness is directly connected to the bus bar without any connectors.

12. The electrical connection system according to claim 11, wherein the bus bar is grounded at only a single location provided on a first distal end thereof, and the bus bar is fixed at a second distal end thereof that is opposite to the first distal end.

* * * * *